March 16, 1948. W. A. HETZLER 2,437,818
MACHINE FOR CUTTING POTATOES, INCLUDING A STATIONARY
CUTTER AND RECIPROCATING PLUNGER
Filed Dec. 13, 1945
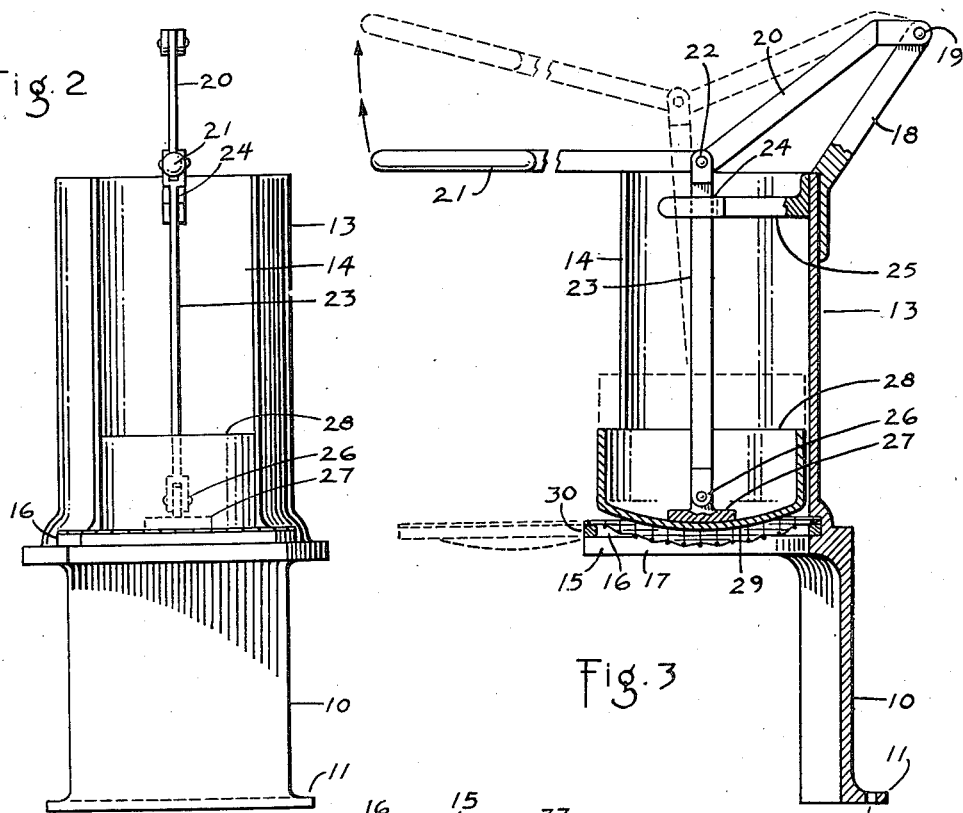

Patented Mar. 16, 1948

2,437,818

UNITED STATES PATENT OFFICE 2,437,818

MACHINE FOR CUTTING POTATOES, INCLUDING A STATIONARY CUTTER AND RECIPROCATING PLUNGER

Walter A. Hetzler, Decatur, Ill.

Application December 13, 1945, Serial No. 634,677

2 Claims. (Cl. 146—169)

My invention relates to machines or devices for cutting potatoes into small strips for frying.

One of the main objects of my invention is to provide a machine or device of the class referred to which is of convenient size for kitchen use, which is efficient in operation, and which is low in cost and easy to maintain in a clean and sanitary condition.

Another particular object of my invention is to provide a machine of the class referred to in which the cutting instruments adapted for cutting potatoes and the like into pieces of different forms and sizes may be easily interchanged in the machine and also may be easily removed for cleaning and storage for future use.

One particular advantage of my improved machine is that it may be used not only for cutting potatoes into strips, but may also be used for cutting other vegetables and fruits into strips or cubes to be cooked or served with salads or fruit cocktails in a raw state.

Further objects and advantages of my invention will appear from the following description and the accompanying drawings forming a part of this application.

In the drawings:

Fig. 1 is a top plan view of my improved cutting machine;

Fig. 2 is a front elevation thereof;

Fig. 3 is a side elevation in cross section taken on the line 3—3 of Fig. 1.

Fig. 4 is a bottom plan view; and

Fig. 5 is a perspective view of one of the cutting instruments.

Referring to the drawings by numerals in which like numerals indicate like parts in the several views, 10 is the machine base having an arcuate flange 11 at its lower end with holes 12 through which screws may be inserted into a table to hold the machine in a fixed position. The base 10 has an upwardly extending hollow body 13 of semi-circular formation and open at its front as shown at 14. The base 10 has also a horizontally disposed U-shaped support 15, which is open at its front and of closed circular formation at its rear, leaving the entire central portion thereof open. Formed in the support, about its inner upper edge is a recess 16 extending from the front along the straight sides 17 of the support 15, and about the circular portion of the support at the rear thereof, and adapted to receive therein a slidable frame.

Secured to the body 13 is a rearwardly and upwardly inclined standard 18 on which is pivotally mounted at 19 a downwardly and forwardly inclined lever 20 having a handle 21. Pivoted at 22 is a vertically disposed plunger shaft 23 which is guided in an opening 24 in the free end of a bracket 25 secured to the inner wall of the body 13.

Pivotally mounted on the lower end of the support 23 at 26 is a bracket 27 carrying a cup shaped plunger 28 which is open at its upper end and has a dished bottom with its outer convex wall 29 directed downwardly toward support 15.

Mounted in recess 16 is a relatively thin frame 30 having a centrally disposed circular opening 31 and straight sides 32 corresponding to the straight sides 17 of support 15. This frame 30 is adapted to fit snugly but slidably into recess 16. Secured across circular opening 31 to its edges is a row of piano wires 33 and another row of similar wires intersecting the wires of the first row. These wires are securely soldered together at their intersections to form a screen in opening 31 with square meshes. The entire screen is dished to conform to the bottom 29 of the cup shaped plunger 28. When the frame 30 is properly placed in recess 16 the curves of the wire screen and the bottom of plunger 28 are parallel to each other.

In the embodiment of my invention shown in the drawings the lever 20 and plunger shaft 23 are made out of flat steel. The frame 10 and body portion 13 are preferably formed in one integral casting from iron or other suitable material. However, the details of these parts may be varied as may be found expedient in the manufacture of the machine.

In the operation of my improved machine a potato or other vegetable to be cut into small parts is placed in the dished wire screen and the plunger 28 forced down upon it by means of handle 21. The vegetable or fruit will be forced through the square meshes, the wires 33 cutting it into strips having a square cross section. If it is desired to form the strips into cubes they may be laid across the wires, and the plunger 28 forced down upon them. The strips or cubes will fall through the meshes into a receptacle placed on the table below the screen.

When it is desired to cut a potato or other vegetable or fruit into smaller or larger pieces a frame 30 having a smaller or larger mesh screen will be substituted for the one in the machine. The operation of cutting may be performed as rapidly as the vegetables or fruit can be placed into the dished screen.

It is to be understood that various changes in the details of construction of my improved cutting machine may be made within the scope of the following claims without departing from the spirit of my invention.

Having described my invention, I claim:

1. A device of the class described, comprising a base having a cylindrical vertically extending body portion open at its upper end and its front, a horizontally extending substantially U-shaped support open at its front end and of closed circular formation at its rear end and formed to provide a recess, a circular plunger mounted for reciprocal movement within said cylindrical body portion, a removable cutting instrument in said recess having a centrally disposed opening therein and a plurality of cutting wires secured across said opening in intersecting relation to one another to form a cutting screen with relatively large meshes, said wires secured at their intersections, said intersecting wires being of dished formation and the lower end of said plunger being convex to fit within said wires, and means including a vertical shaft attached to said plunger and a horizontal lever pivoted at one end to said body portion and having a handle portion at its other, and pivotally secured intermediate its ends to the upper end of said shaft.

2. A device of the character described including, a base member having means for connecting the same to a supporting surface, a standard carried by said base, a substantially U-shaped support connected at its bight portion to said standard and extending outwardly at right angles thereto in parallel spaced relation to the base member and having an inwardly facing recess therearound, a reticulated cutting member of concavo-convex form slidably received in said recess so as to be supported by said U-shaped support, a substantially U-shaped tubular guide member connected at its bight portion so as to be supported above and in vertical alinement with said U-shaped support and the cutting member carried by the latter, a plunger slidably mounted in said tubular guide member having its lower face conformed to engage the reticulated cutting member, and means movably connected to the upper end of the standard and to the plunger for moving the latter toward and away from said cutting member, whereby material placed between the cutting member and the plunger through the opening in the guide member may be comminuted upon movement of the plunger toward and into engagement with said cutting member.

WALTER A. HETZLER.

REFERENCES CITED

The following references are of record in the file of this patent:

UNITED STATES PATENTS

| Number | Name | Date |
|---|---|---|
| 965,384 | Gebauer | July 26, 1910 |
| 1,021,968 | Bush | Apr. 2, 1912 |
| 1,457,137 | Barbey | May 29, 1923 |
| 1,740,472 | McFarland | Dec. 24, 1929 |